United States Patent [19]
Zabert et al.

[11] 3,831,080
[45] Aug. 20, 1974

[54] ELECTRIC POWER SUPPLY FOR ELECTRONIC EQUIPMENT

[75] Inventors: Alessandro Zabert, Chiaverano; Edoardo Bettin, Ivrea, both of Italy

[73] Assignee: Ing. C. Olivetti & C. S.p.A., Ivrea (Torino), Italy

[22] Filed: Jan. 17, 1972

[21] Appl. No.: 218,343

[30] Foreign Application Priority Data
Jan. 18, 1971  Italy.................................. 67152/71

[52] U.S. Cl....................... 321/18, 307/43, 307/69, 321/27 MS
[51] Int. Cl. .......................................... H02m 7/00
[58] Field of Search .......... 307/43, 64, 69; 318/123, 318/248, 440, 564; 321/19, 18; 323/23, 25

[56] References Cited
UNITED STATES PATENTS

| | | | |
|---|---|---|---|
| 3,071,720 | 1/1963 | Geissing | 307/43 |
| 3,079,543 | 2/1960 | Decker | 323/22 T |
| 3,135,910 | 6/1964 | Hamilton | 307/43 R |
| 3,145,330 | 8/1964 | Hecht | 318/564 |
| 3,353,092 | 11/1967 | Rubin | 318/564 X |
| 3,512,044 | 5/1970 | Jones | 323/22 T X |
| 3,521,150 | 7/1970 | Bates | 323/25 X |
| 3,675,114 | 6/1971 | Nergessian | 323/23 X |

*Primary Examiner*—William M. Shoop, Jr.
*Attorney, Agent, or Firm*—I. J. Schaefer

[57] ABSTRACT

A modular electric power supply for electronic equipments includes a main voltage generator having a transformer fed from the mains for generating a predetermined voltage and controlled by a main control circuit as to keep the voltage constant. The power supply includes also a variable number of slave generators connectable in parallel with the main generator and controlled by associated control circuits subordinate to the main control circuit. The power supply includes also an under-voltage protection circuit and an over-voltage protection circuit. This latter is adapted to short-circuit the output of the main voltage generator and to drive the under-voltage protection circuit when the output voltage exceeds a predetermined upper limit. A limiting transistor is driven by a voltage drop occurred in the circuit power supply to cooperate with the under-voltage circuit in controlling the power supply.

3 Claims, 5 Drawing Figures

ELECTRIC POWER SUPPLY FOR ELECTRONIC EQUIPMENT

BACKGROUND OF THE INVENTION

The present invention relates to a modular electric power supply for electronic equipment, having a voltage generator comprising a transformer fed from the mains for generating a predetermined voltage, and control means for keeping this voltage constant on variation of the load within given limits. Such a power supply is used, for example, in supplying the logic circuits of electronic equipment. The supply for the logic circuits must be properly stabilized for the correct operation of the same and of the electronic apparatus making use thereof. Variations in the applied voltage, even if they are transient, can produce faulty operation of the logic circuits.

Many power supplies for logic circuits are known. They generally have control circuits for the output voltage and protective circuits which are designed so as to ensure electrical characteristics suitable for the working conditions of the circuits to be supplied, that is so as to ensure a fixed voltage or current output corresponding to the particular circuit to be supplied. Any increases in output that may be necessary, due, for example, to further logic circuits being connected, are obtained by replacing the entire power supply with another power supply of suitable characteristics.

SUMMARY OF THE INVENTION

The object of this invention is to provide an electric power supply of modular type and such as to be capable of adaptation to the most varied output requirements by means of the simple connection or disconnection of modular units, without having to replace the entire power supply.

According to the present invention there is provided a modular electric power supply for electronic equipment, including a voltage generator comprising a first transformer adapted to be fed from the mains for generating a predetermined voltage at output terminals therof, and first control means for keeping this voltage constant on variation of the load within certain limits, and a slave generator having characteristics of modularity with respect to the voltage generator and comprising another transformer adapted to be fed from the mains for generating a current at the predetermined voltage at output terminals thereof, the slave generator being connected in parallel at its output terminals with the voltage generator and being provided with second control means subordinate to the first control means.

The power supply can further comprise a circuit for protection from under-voltage which is connected to the base of a driving transistor which regulates the predetermined voltage, the protection circuit being responsive to the output of a differential amplifier adapted to compare a voltage derived from the output voltage of the power supply with a fixed reference voltage, the protection circuit being adapted to cause the cutting-out of the power supply in the event of the voltage delivered falling below a predetermined value.

To this end, the servo generator comprises a current limiting circuit. On the occurrence of an increase beyond the upper control limit of the current, this limiting circuit transmits the variation of the under-voltage protection circuit in the voltage generator, which produces the cutting-out of the entire power supply.

One or more slave generators may therefore be placed in parallel with the voltage generator circuit. In this way, for the same voltage supplied by the voltage generator, the power supply is able to supply a double, triple, etc. current.

BRIEF DESCRIPTION OF THE DRAWINGS

The invention will be described in more detail by way of example, with the aid of the accompanying drawings, in which.

DESCRIPTION OF A PREFERRED EMBODIMENT

Figure 1:
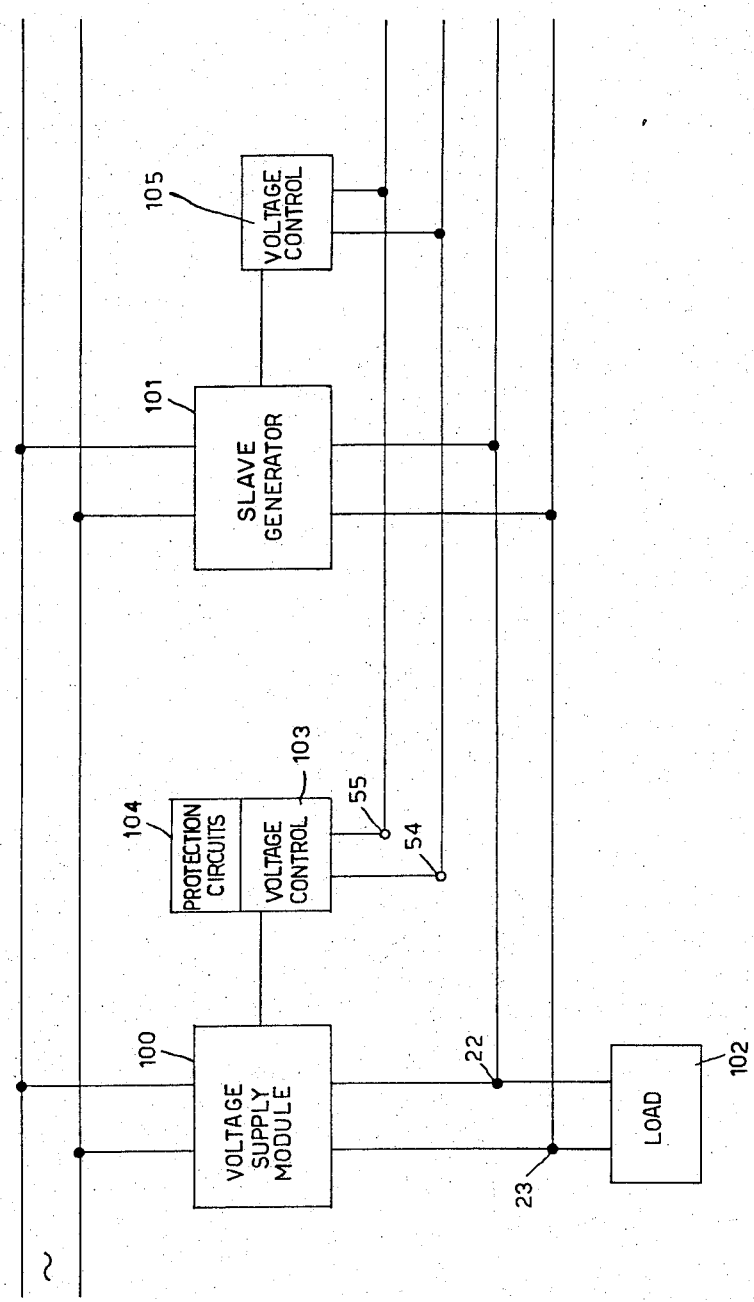
FIG. 1 is a block diagram of a modular electric power supply embodying the invention.

The modular power supply to be described is suitable for supplying electronic equipment and in particular integrated logic circuits of the type used in data processing equipment.

The modular power supply comprises a module 100 (FIG. 1) forming a voltage generator and one or more slave generators 101 located in parallel with the voltage generator 100 and having characteristics of modularity with the generator 100.

According to a first embodiment, the power supply is designed for a voltage of 5 V. The external supply mains are applied to the voltage generator 100 illustrated in FIG. 2 through a voltage selector 1 having two winding sections 2 and 3 forming the primary winding of a transformer 4 of the ferro-resonant type for supplying the generator 100. The positioning of the voltage selector 1 determines the connection of the two sections 2 and 3 in series or in parallel in accordance with the value of the mains voltage. Thus, the power supply is designed for two external mains voltages, 110–120 V and 220 – 240 V.

The transformer 4 has three secondary-winding sections 5, 6 and 7, of which the section 5 serves to supply a power line 10, to the terminal 22 of which are connected the logic circuits constitituting the load. The section 6 serves to supply a micrologic circuit 11 comprising voltage control means 103 (FIG. 1) which will be seen better hereinafter. Finally, the section 7 (FIG. 2) serves to supply a capacitor 12 the purpose of which is to stabilize the output voltage of the ferroresonant transformer 4 when the mains voltage varies within the limits of + 10 and − 15 percent of the voltage provided by the voltage selector 1. In fact, the section 7 and the capacitor 12 constitute a resonant circuit which, at its inherent characteristic frequency, produces a phenomenon of stabilization of the other secondary voltages on the primary voltage varying within the above-mentioned limits.

Before the secondary voltage present at the terminals of the section 5 reaches the line 10, it is rectified by a rectifying bridge 13 and filtered by two capacitors 14 and 15. A fuse 16 is located in the line 10. The line is connected to the collector 17 of a power transistor 18 regulating the output voltage. This transistor 18 is controlled at its base 19 by the micrologic circuit 11, as will be seen better hereinafter. Finally, an indicating resistor 21 is inserted in series between the emitter 20 of the transistor 18 and the output terminal 22. The load 102 (FIG. 1) is connected between the terminal 22 and another terminal 23 connected to the other terminal of the bridge 13 (FIG. 2). A resistive divider 29, 30 is moreover connected between the terminals 22 and 23.

The control means 103 (FIG. 1) for the output voltage of the generator 100 provide for keeping this voltage constant, if for any reason this is subjected to variations within a pre-established range of regulation. These control means 103 are supplied by the voltage present in the secondary section 6, rectified by a diode 25 and filtered by a capacitor 26. The voltage control means 103 substantially comprise a differential amplifier 27 and a transistor 28 driving the power transistor 18. The differential amplifier 27 effects a continuous comparison between a voltage proportional to the output voltage present at the central point of the resistive divider 29, 30 and a constant reference voltage obtained from a circuit inside the micrologic circuit 11. This constant voltage is sampled by a second resistive divider 31, 33 connected between the terminal 23 and a reference terminal R of the micrologic circuit 11. A potentiometer 32 is disposed between the two resistors of the divider 31, 33.

The reference voltage picked up at the potentiometer 32 is applied to the positive input of the differential amplifier 27, while the output voltage picked up at the divider 29, 30 feeds the negative input of said amplifier 27. The difference between the two voltages is amplified and applied to the base of the driving transistor 28, which is supplied by the secondary section 6 by means of a resistor 34. The emitter of the transistor 28 is connected through a diode 35 to the base 19 of the transistor 18, the base being biased by the resistor 36. The diode 35 constitutes a short-circuit for the transmission of the current from the transistor 28 to the base 19 and protects both the micrologic circuit 11 and the transistor 18 from possible voltage disturbances originating from the terminal 22. These produce a variation in conduction in the transistor 18, which causes a similar variation at the point of pick-up of the voltage of the divider 29, 30 by the amplifier 27. The variation, amplified and changed in sign, is then applied to the base of the transistor 28, which varies its conduction of opposite sign to that undergone by the transistor 18. The variation in conduction of the transistor 28 is then applied to the base 19, consequently causing the resumption of normal working conditions.

Figure 2:
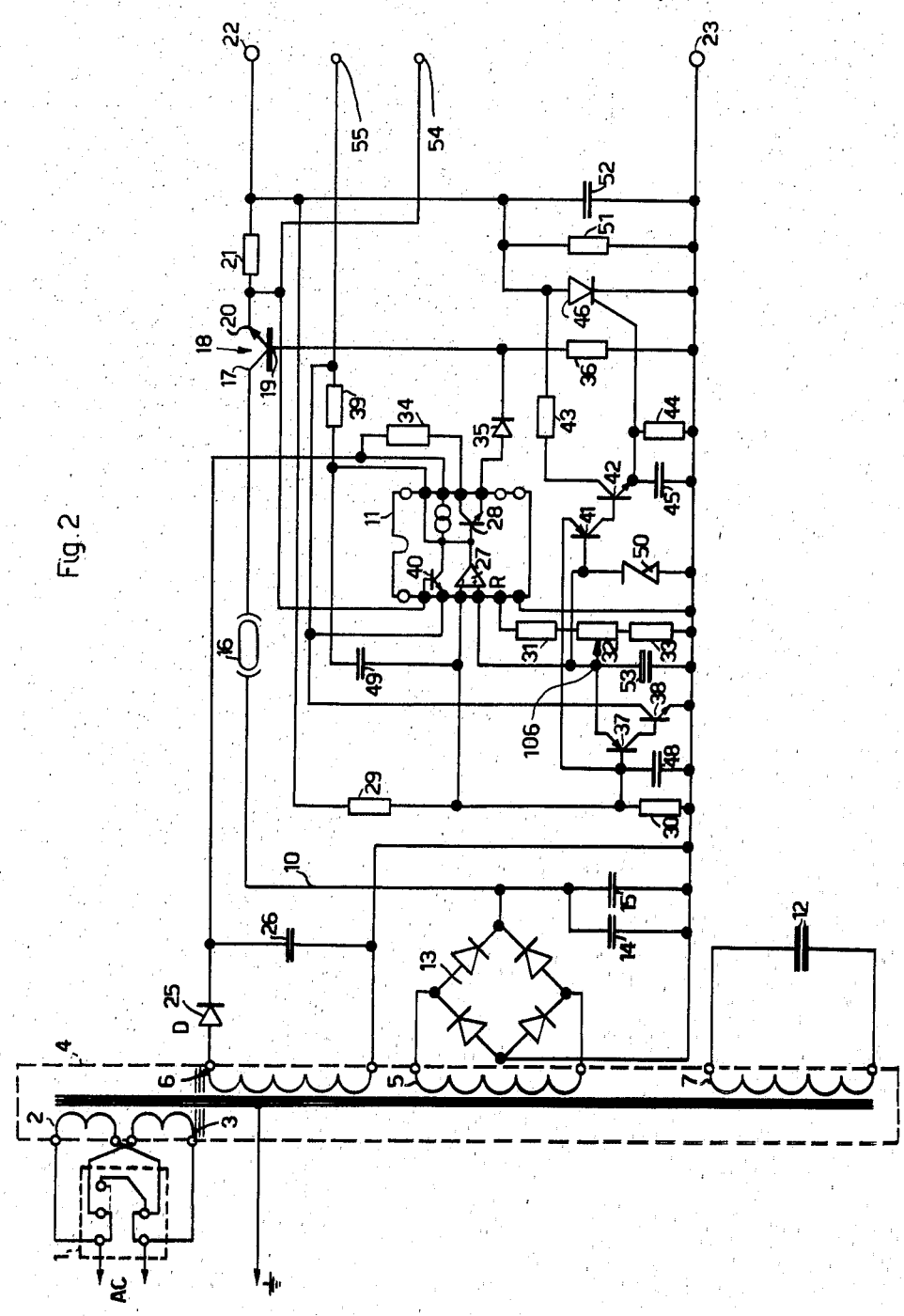
FIG. 2 shows the electric circuit of the voltage generator of the modulator power supply according to a first embodiment of the invention.

When the variations in voltage at the terminal 22 exceed the upper and lower limits of the predetermined range of regulation, under-voltage or over-voltage protection circuits intervene, these being indicated generally by the reference 104 in FIG. 1. The object of this intervention is to protect both the voltage generator and the logic circuits from undesirable electrical conditions which are not controllable by the control means 103.

Protection from the condition of under-voltage, which occurs, for example, owing to a short-circuit or because of a sudden reduction in the load, is entrusted to two transistors 37 (FIG. 2) and 38, the collector of the transistor 37 being connected to the base of the transistor 38. The transistor 37 is of the P-N-P type, while the transistor 38 is of the N-P-N type. The emitter of the transistor 37 is connected to the slider of the potentiometer 32 and therefore to the fixed reference voltage applied at R, while the base is supplied from the intermediate point of the resistive divider 29, 30 at a voltage proportional to the output voltage. The collector of the transistor 38, on the other hand, is connected through a limiting resistor 39 to the base of the driving transistor 28.

If a short-circuit occurs at the output terminals 22, 23, the corresponding voltage decreases and the intermediate voltage of the divider 29, 30 also decreases proportionally. This decrease is sufficient to trigger the transistor 37, which consequently causes conduction of the transistor, 38. The conduction of the transistor 38 lowers the base voltage of the driving transistor 28 until it is inhibited, as a result of which the generator 100 is cut out.

The inhibition of the transistor 28 is also assisted by the intervention of N-P-N transistor 40 which, as will be seen hereinafter, is adapted to limit the output current and is contained in the micrologic circuit 11. The collector of the transistor 40 is also connected to the base of the driving transistor 28, while the base is connected to the emitter 20 of the power transistor 18.

On an increase in the output current, due for instance to a short-circuit, the potential of the emitter 20 of the transistor 18 increases and causes the intervention of the limiting transistor 40. The effect of the conduction of the transistor 40 is manifested in a further lowering of the base voltage of the driving transistor 28, therefore promoting the inhibition thereof. Consequently, since the transmission of current from the transistor 28 to the base 19 of the transistor 18 is lacking, the last-mentioned transistor is inhibited, causing the cutting out of the entire power supply.

Protection from the condition of over-voltage is entrusted to another two transistors 41, 42 connected similarly to the transistors 37 and 38. The transistor 42 drives a controlled diode 46 inserted between the terminals 22 and 23. The P-N-P transistor 41 has its emitter connected to the intermediate point of the divider 29, 30. The base is fed from the constant voltage point of the potentiometer 32 and the collector is directly connected to the base of the N-P-N transistor 42. The collector of the latter transistor is fed by the output voltage of the terminal 22 through a limiting resistor 43, while the emitter is connected to the terminal 23 by means of a resistor 44 and a capacitor 45.

On the occurrence of an over-voltage at the output terminals 22, 23, the potential of the intermediate point of the resistive divider 29, 30 and, therefore, of the emitter of the transistor 40 acquires a higher value. The triggering of the transistor 41 is therefore produced and, consequently, that of the transistor 42. The flow of the current in the latter transistor causes a drop in voltage at the ends of the resistor 44 sufficient to trigger the controlled diode 46. In this way, the output terminals 22 and 23 are short-circuited to promote the reduction of the voltage. This, however, constitutes a reason for the intervention of the transistors 37 and 38 of the under-voltage protection circuit which, as has been seen before, produces the cutting out of the entire power supply.

To avoid external conditions, in particular conditions connected with radio frequency disturbances, having an effect on, or forcing, any quantity in such manner as to obtain undesirable results, the base of the transistor 37 is connected to a capacitor 48, while the emitter of the transistor 42 is connected to a capacitor 45. Another capacitor 49 inserted between the input and output of the differential amplifier 27 serves to prevent possible triggering of oscillations in the power supply. A Zener diode 50 located between the slider of the potentiometer 32 and the terminal 23 represents a further safety device for the logic circuits if the reference voltage at the terminal R of the micrologic circuit 11, which is connected to the diode 50 through the same potentiometer, should not be correct.

Between the two output terminals 22, 23 there is moreover inserted a resistor 51 for the purpose of ensuring a limited functionality of the power supply especially when the output is not supplying the load. In parallel with the resistor 51 there is disposed a capacitor 52 adapted to eliminate possible oscillations generated externally owing to sudden variations in the load.

Another capacitor 53 of suitable value inserted between the slider of the potentiometer 32 and the terminal 23 makes the turning-on of the generator 100 (FIG. 1) possible. In fact, by inserting the capacitor 53, there is imposed on the generator 100 a charging time constant greater than that of the capacitor 52 (FIG. 2). In this way, on turning on, which constitutes a short-circuit for the capacitor 52, the under-voltage protection circuit 37, 38 is prevented from being triggered, which circuit would turn the generator 100 (FIG. 1) off again. Finally, the generator 100 is able to generate various output voltages by replacing the transformer 4 (FIG. 2), the filtering cell 14, 15 and the resistor 30, while keeping the remainder of the circuit unchanged.

The slave generator 101 (FIG. 1) is substantially similar to the voltage generator 100, since it retains the same power circuit as the voltage generator 100. On the other hand, it is devoid of the under-voltage and over-voltage protection circuits inasmuch as, as will be seen, it is subordinate to the voltage generator 100, while it is provided with its own control means 105 similar to the control means 103. The servo generator 101 therefore has characteristics of modularity with the voltage generator 100.

Figure 3:
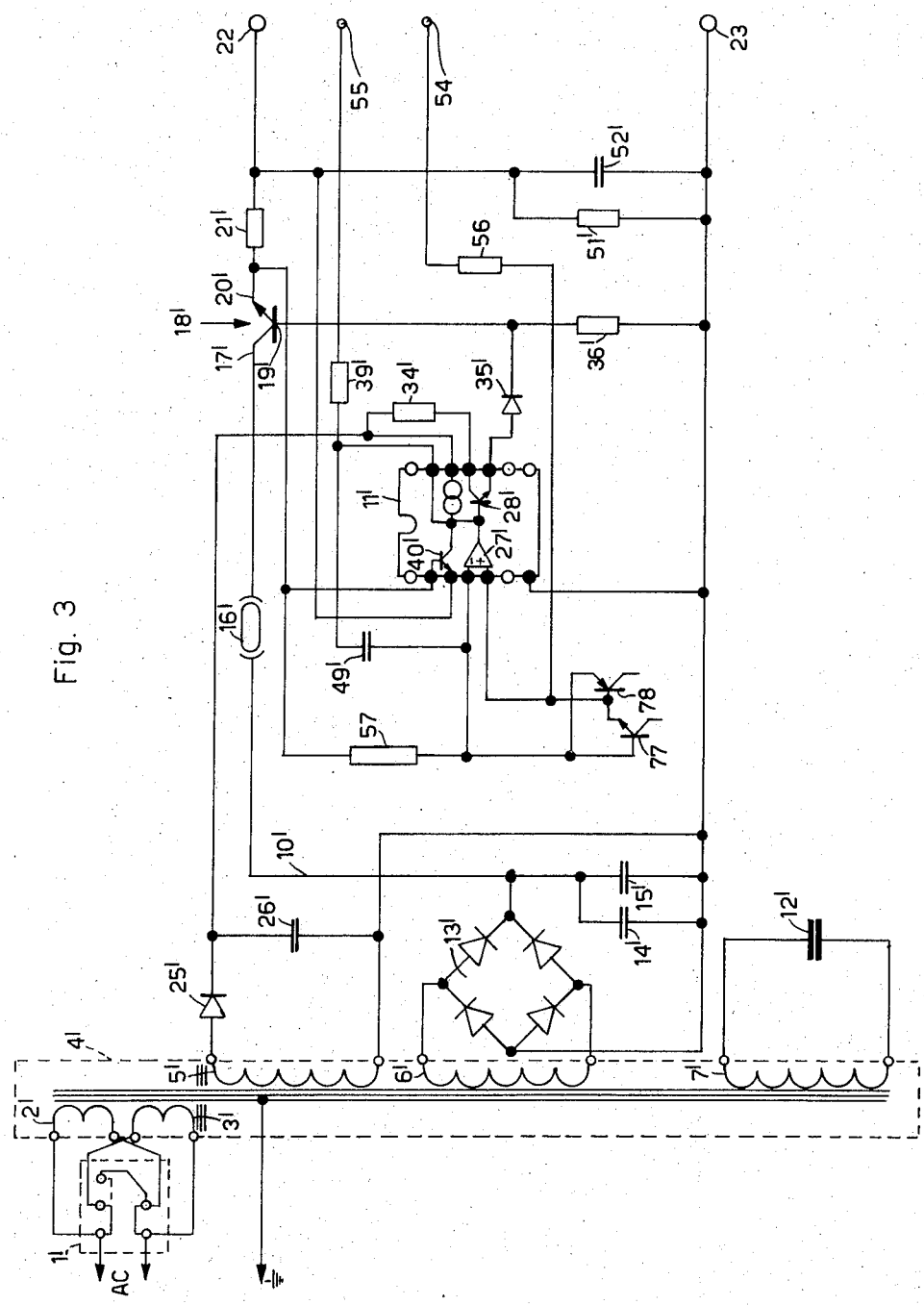
FIG. 3 shows the electrical circuit of a slave generator of the modular power supply of FIG. 2.

The servo generator 101 is shown in detail in FIG. 3, in which the circuit components equivalent to those of the voltage generator are indicated by the same number furnished with a prime and will not be further described, these components having the same function as the corresponding components in the voltage generator.

The arrangement of the voltage generator 100 (FIG. 1) in parallel with the servo generator 101 is achieved by connecting the latter to the same terminals 22 and 23. There are moreover provided another two terminals 54 and 55 to which both the control means 103 of the voltage generator and the control means 105 of the current generator are connected.

The control means 105 are formed by means of a micrologic circuit 11' containing two transistors 28' and 40' and a differential amplifier 27'. This is now fed at its positive input section by a reference voltage constitued by the emitter voltage of the transistor 18 (FIG. 2) of the voltage generator, through the terminal 54 and a limiting resistor 56 (FIG. 3). The negative input section of the same amplifier 27', on the other hand, is fed by means of a limiting resistor 57 connected to the emitter 20' of the power transistor 18', by a voltage proportional to the output current of the servo generator.

A comparison between these quantities, effected by the differential amplifier 27', produces at its output an amplified voltage difference adapted to control the conduction of the driving transistor 28' and, consequently, of the power transistor 18'. In fact, an increase in current at the transistor 18' produces a greater command voltage of the negative input of the amplifier 27', causing at the output an amplification of the variation with opposite sign. This limits the conduction of the transistor 28', the base of which is connected to the output of the amplifier 27', and, consequently, the base 19' of the transistor 18', to which the emitter of the driving transistor 28' is connected by means of the diode 35', also feels the effects of this.

When the output of current exceeds a predetermined value, the drop in voltage at the ends of the indicating resistor which is applied between the base and the emitter of the limiting transistor 40' is sufficient to place it in a conducting state. The collector of the transistor 40' is connected to the base of the driving transistor 28', as a result of which the conduction of the first-mentioned transistor lowers the base voltage of the transistor 28', inhibiting the latter and, therefore, also the power transistor 18'. The base of the driving transistor 28' is connected on the one hand, by means of the limiting resistor 39', to the base of the corresponding driving transistor 28 (FIG. 2) of the voltage generator and, on the other hand, is connected to the emitter of the transistor 40 of the voltage generator acting again on the base of the transistor 28. The resistors 39, 39' moreover have the function of decoupling the bases of the transitors 28 and 28' when the various generators 100, 101 are arranged in parallel.

Finally, the base of the transistor 28' is connected to the collector of the transistor 38, that is to the under-voltage protection circuit of the voltage generator, so that, together with the inhibition of the transistor 18', there is also obtained an immediate inhibition of the transistor 18 of the voltage generator. It is therefore clear that the control means 105 (FIG. 1) of the slave generator 101 are subordinate through the reference voltage of the amplifier 27' (FIG. 3) to the control means 103 (FIG. 1) of the voltage generator 100, while a possible irregularity of operation in the slave generator 101 causes the cutting-out of the entire power supply.

The slave generator 101 moreover comprises a pair of transistors 77 and 78 (FIG. 3) like the transistors 37 and 38 of the voltage generator, but having the base-emitter junctions biased in the opposite sense. The two transistors 77 and 78 are connected in a ring to the resistor 57 and are adapted to protect the inputs of the differential amplifier 27' from possible sudden differences in voltage.

Figure 4:
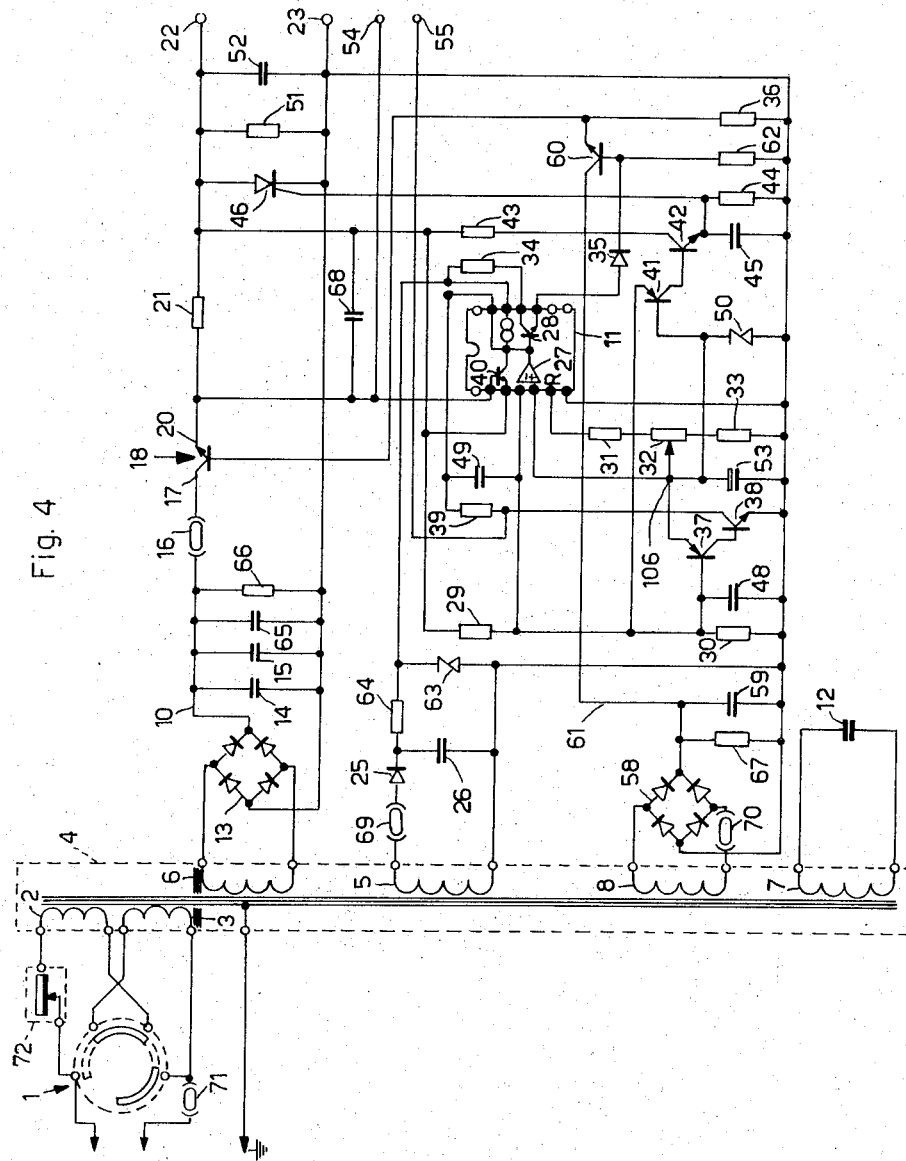
FIG. 4 shows the electric circuit of a voltage generator of a modular power supply according to another embodiment of the invention.
Figure 5:
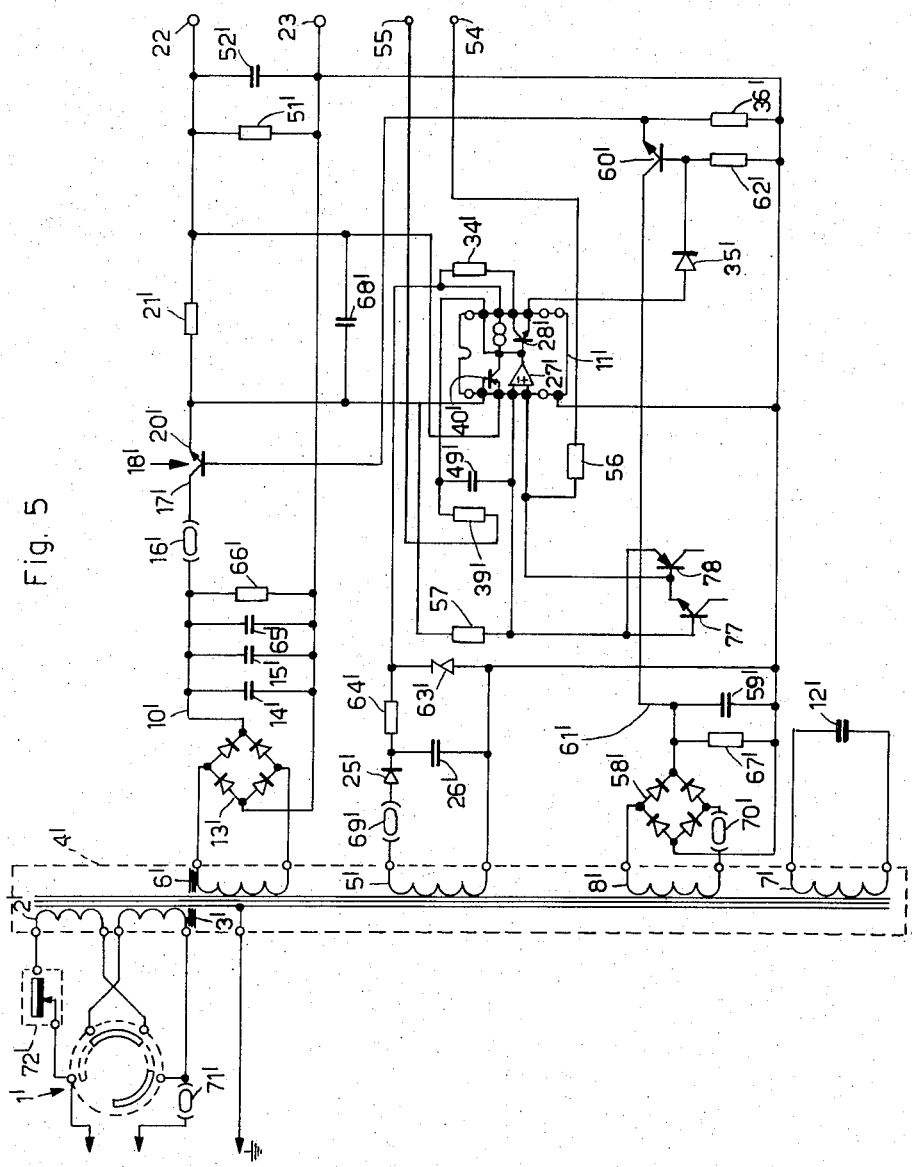
FIG. 5 shows the electric circuit of a slave generator forming part of the modular power supply of FIG. 4.

Another embodiment of the invention, constructed for the purpose of supplying at its output higher powers of the order of ten times those of the generator of FIGS. 2 and 3, comprises a voltage generator illustrated in FIG. 4 and at least one servo generator illustrated in FIG. 5, in which last-mentioned drawings, the elements similar to those seen in the embodiment of FIGS. 2 and 3 are indicated by the same reference numbers. The generators of FIGS. 4 and 5 differ principally from those of FIGS. 2 and 3 in that the transformer 4 now provides a fourth secondary section 8, 8' adapted to feed, through another rectifying bridge 58, 58' and a filter capacitor 59,59', an intermediate power line 61,61'. In this line there is inserted a regulating transistor 60, 60' for driving the power transistor 18, 18' inserted in the main power line 10, 10', the transistors 18 and 18' now being of higher power than those of FIGS. 2 and 3. In these generators, therefore, the control effected by the micrologic circuit 11, 11' (FIGS. 4 and 5) does not act directly on the base 19, 19' of the transistor 18, 18', but on the base of the transistor 60, 60', which base is biased by another resistor 62, 62'. The protective diode 35, 35'is inserted between the emitter of the transistor 28, 28' and the base of the transistor 60, 60'.

For the protection of the micrologic circuits 11 and 11' from unexpected supplies which are dangerous in view of the value of the power in action, another stabilizing stage has been added which is constituted by a Zener diode 63, 63' and and the corresponding load resistor 64, 64', this stage being inserted between the filter capacitor 26, 26' and the micrologic circuit 11, 11'. In addition to this, the filtering cell 14, 15 and 14', 15' of the power line 10, 10' is increased by the addition of a third capacitor 65, 65'. The line 10, 10' is moreover provided with a resistor 66, 66' in parallel with the filtering cell 14, 15 and 14', 15', while the line 61, 61' is provided with a resistor 67, 67' in parallel with the filter capacitor 59, 59' for the purpose of keeping the capacitors discharged as soon as the power supply ceases operation.

Across the ends of the indicating resistor 21, 21' there is moreover inserted another capacitor 68, 68' for the purpose of short-circuiting possible abrupt disturbances originating from the load, which would activate the triggering of the limiting transistor 40, 40' and the under-voltage protection by the transistors 37, 38.

For preserving the supplied circuits from possible rises in voltage, fuses 69, 70 and 71 and 69', 70' and 71', respectively, are provided, while a thermal cut-out 72, 72' inserted in the primary circuit of the transformer 4, 4' has the task of opening this circuit and, therefore, of turning off the power supply when the temperature of the power transistor 18, 18' exceeds a predetermined value.

It is understood that various other modifications, improvements and additions or substitutions of parts may be made in the power supply described without departing from the scope of the invention. For example, the capacitor 48 (FIG. 2) may be replaced by another two capacitors, one of which is disposed between the base and the emitter of the transistor 38 and the other between the base of the transistor 42 and the terminal 23, for the purpose of avoiding the introduction of a return into the feedback loop of the differential amplifier 27.

Moreover, a resistor may be inserted between the slider 32 and the node 106 of the generator of FIG. 2 for the purpose of preventing the over-voltage protection circuit coming into action during the turning-on of the power supply and erroneously and prematurely turning the power supply off.

We claim:

1. A constant voltage modular electric power supply for electronic equipment including:
   a. a master constant voltage generator comprising
      a first rectifier circuit fed from a first transformer connected to the mains, for generating a predetermined voltage;
      first control means for keeping said voltage constant on variation of the load within certain limits second control means for protecting said electric power supply from over-voltage or under-voltage conditions,
   b. at least one slave generator connected in parallel with said master generator generating current at said predetermined voltage, comprising
      a second rectifier circuit fed from a second transformer connected to the mains, for generating said prdetermined voltage, and
      third control means, subordinate to said first control means, for keeping the output voltage of said slave generator constant on variation of the load, within certain limits.

2. A constant voltage modular electric power supply as in claim 1, wherein each of said transformer is provided with a primary winding and at least a first and second secondary winding, said primary winding being connected to the mains, said first secondary winding feeding said rectifier circuit and said second secondary winding feeding said control means.

3. A constant voltage modular electric power supply as in claim 2, wherein said first control means includes a power transistor connected in series between said rectifier circuit and the load, said second control means including:
   a driving transistor driving the base of said power transistor,
   a differential amplifier controlling the base of said driving transistor in order to vary continuously the conductivity of said power transistor, comparing a voltage proportional to the output voltage of said master generator with a reference voltage.
   a limiting transistor connected by the collector to the base of the driving transistor, and
   an indicating resistor in series with said power transistor to drive said limiting transistor when a predetermined voltage drop is produced,
said third control means including:
   a power transistor connected in series between said rectifier circuit and the load,
   a driving transistor driving the base of said power transistor,
   a differential amplifier controlling the base of said driving transistor for regulating the conductivity of said power transistor, said differential amplifier comparing a voltage proportional to the output voltage of said slave generator with a voltage proportional to the output
   a limiting transistor having its collector connected to the base of the driving transistor, and
   an indicating resistor in series with said power transistor for driving said limiting transistor when a predetermined voltage drop is produced.

* * * * *

UNITED STATES PATENT OFFICE
CERTIFICATE OF CORRECTION

Patent No. 3,831,080    Dated August 20, 1974

Inventor(s) Alessandro Zabert et al

It is certified that error appears in the above-identified patent and that said Letters Patent are hereby corrected as shown below:

In column 8, line 10, after "limits" insert --, and--;

line 20, delete "prdetermined" and insert --predetermined--;

line 44, delete "." and insert --,--;

line 60, after "output" insert --voltage of said master generator--.

Signed and sealed this 19th day of November 1974.

(SEAL)
Attest:

McCOY M. GIBSON JR.
Attesting Officer

C. MARSHALL DANN
Commissioner of Patents